United States Patent Office 3,632,560
Patented Jan. 4, 1972

3,632,560
POLY (1,3,4-OXADIAZOLES) AND THEIR SYNTHESIS
You-Ling Fan, East Brunswick, N.J., assignor to Union Carbide Corporation, New York, N.Y.
No Drawing. Filed Jan. 29, 1969, Ser. No. 795,076
Int. Cl. C07d 85/54
U.S. Cl. 260—78.4 R        5 Claims

ABSTRACT OF THE DISCLOSURE

Normally solid poly(1,3,4-oxadiazoles) can be prepared by the cyclodehydration of N,N'-bis(isomaleimide). polyhydrazides. These products are characterized by their thermal stability and high melting points.

---

This invention relates to poly(1,3,4-oxadiazoles) and to their synthesis from N,N'-bis(isomaleimide) polyhydrazides.

It has been found that polyhydrazides prepared by the polymerization of equimolar quantities of N,N'-bis(isomaleimide) and dihydrazides as well as those prepared by the low temperature solution condensation polymerization of N,N'-bis(isomaleimide) dihydrazide adducts and a diacyl chloride can be cyclodehydrated to poly(1,3,4-oxadiazoles) having a repeating unit represented by the formula:

$$\left[\left(\underset{N-N}{\overset{O}{C}}\underset{CH=CH}{\overset{O}{C}}\underset{N-N}{\overset{O}{C}}\underset{CH=CH}{\overset{O}{C}}\underset{N-N}{\overset{O}{C}}C-R\right)\left(\underset{N-N}{\overset{O}{C}}C-R'\right)_q\right]_n$$

wherein each of R and R' is a divalent hydrocarbon radical selected from the group consisting of alkylene radicals having 1 to about 18 carbon atoms and arylene radicals having 6 to about 10 carbon atoms, $q$ is an integer having values of 0 to 1 and $n$ is an integer indicating the degree of polymerization and is sufficiently large to afford a normally solid poly(1,3,4-oxadiazole).

The cyclodehydration of the first class of polyhydrazides can be represented as follows:

$$\left(\underset{CH=CH}{\overset{O\ O}{C\ C}}-NHNH-\underset{CH=CH}{\overset{O\ O}{C\ C}}-NHNH-\overset{O}{C}-R-\overset{O}{C}-NHNH\right)_n \longrightarrow$$

$$\left(\underset{N-N}{\overset{O}{C}}\underset{CH=CH}{\overset{O}{C}}\underset{N-N}{\overset{O}{C}}\underset{CH=CH}{\overset{O}{C}}\underset{N-N}{\overset{O}{C}}C-R\right)_n$$

where R and $n$ are as defined above.

The cyclodehydration of the second class of polyhydrazides can be represented as follows:

Preferred temperatures for the thermal cyclodehydration are about 80° to 300° C. although higher temperatures can be used if desired.

The preferred temperature range for chemical cyclodehydration is about 150 to 250° C. although other ranges such as 80 to 150° C., 100 to 300° C. or 250 to 350° C. can be use if desired.

The inert atmosphere used with the thermal cyclodehydration is readily supplied by conducting the reaction under such gases as argon, krypton, xenon, or nitrogen and the like.

The preferred dehydrating agents when the cyclodehydration of the polyhydrazides is carried out chemically are polyphosphoric acid and phosphorous pentoxide. Other dehydration agents which can be used include thionyl chloride, phosphorus oxychloride, trifluroacetic anhydride, acetic anhydride and the like. When phosphorus pentoxide is employed it is preferred to use an amine such as triisopropyl amine, triisobutyl amine and the like in conjunction with it.

The chemical cyclodehydration can be carried out in conventional equipment well known in the art including glass vessels, glass lined vessels, stainless steel vessels and the like.

The thermal cyclodehydrations can be effected by any type of heating equipment operable in the desired temperature range.

Pressure is not narrowly critical in either cyclodehydration technique although atmospheric pressures are preferred for economic reasons.

The progress of the cyclodehydration of polyhydrazides can be followed at successive stages of the reaction by infrared spectroscopy by the disappearance of the —NH stretching band (about 3200 cm.$^{-1}$) and the amine I band (about 1650 cm.$^{-1}$) which are characteristic of the hydrazide group and the appearance of new absorption bands (at about 1720 to 1430 cm.$^{-1}$) due to the formation of the 1,3,4-oxadiazole ring.

Where R or R' are alkylene radicals those preferred in the practice of this invention are —(CH$_2$)$_{10}$—, —(CH$_2$)$_8$—, —(CH$_2$)$_6$—, —(CH$_2$)$_4$— and the like.

Where R or R' are arylene radicals those preferred are $$\left(\underset{CH=CH}{\overset{O\ O}{C\ C}}-NHNH-\underset{CH=CH}{\overset{O\ O}{C\ C}}-NHNH-\overset{O}{C}-R-\overset{O}{C}-NHNH-\overset{O}{C}-R'-\overset{O}{C}-NHNH\right)_n \longrightarrow$$

$$\left(\underset{N-N}{\overset{O}{C}}\underset{CH=CH}{\overset{O}{C}}\underset{N-N}{\overset{O}{C}}\underset{CH=CH}{\overset{O}{C}}\underset{N-N}{\overset{O}{C}}C-R-\underset{N-N}{\overset{O}{C}}C-R'\right)_n$$

wherein R, R' and $n$ are as defined previously.

In each case the cyclodehydration can be effected either thermally in an inert atmosphere or chemically by contacting the polyhydrazide with a dehydrating agent.

The poly(1,3,4-oxadiazoles) containing alkylene radicals, represented by R or R', are dark brown solids which soften at about 185° C. and melt at temperatures below those of the precursor polyhydrazides.

The poly(1,3,4-oxadiazoles) containing arylene radicals, represented by R or R', soften at about 300° C. but show no evidence of melting below about 310° C.

Both types of poly(1,3,4-oxadiazoles) are insoluble in common organic solvents including ketones such as acetone, methylethyl ketone, hexanone-2, diisopropyl ketone or cyclohexanone; alcohols such as methanol, ethanol, isopropanol, or cyclohexanol; aliphatic hydrocarbons such as hexane, heptane, or octane and aromatic hydrocarbons such as benzene, toluene, xylene and the like.

The poly(1,3,4-oxadiazoles) of this invention can be used in the fabrication of fibers and formed articles as well as adhesives, sealants and coating materials.

The invention is further described in the examples which follow. All parts and percentages are by weight unless otherwise specified.

EXAMPLE 1

Preparation of poly(1,3,4-oxadiazole) by thermal cyclodehydration of a polyhydrazide.

A polyhydrazide derived from sebacic acid and N,N'-bis(isomaleimide) having repeating units which can be represented as:

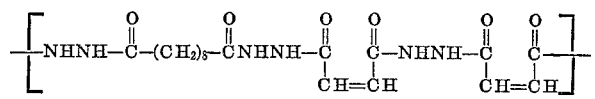

and a reduced viscosity of 0.42 (when measured at a concentration of 0.2 gram in 100 ml. of dimethyl sulfoxide at 25° C.) was placed on a ceramic disk in finely divided form and transferred under an argon atmosphere into a quartz tube mounted in a Hoskins furnace preheated to a temperature of 300° C. As cyclodehydration took place water condensed at the outer sections of the qaurtz tube, after a period of exposure of 0.5 minute. The disk and product were removed from the furnace and cooled to room temperature in an argon atmosphere.

The product was a dark brown solid having a reduced viscosity of 0.085 (when measured at a concentration of 0.2 gram in 100 ml. of sulfuric acid at 25° C.) and a melting point range of about 180 to 210° C.

This product was poly(1,3,4-oxadiazole) having repeating units which may be represented as:

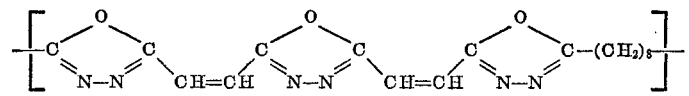

EXAMPLE 2

Example 1 was repeated with the exception that the polyhydrazide was exposed to a temperature of about 180° C. for 120 minutes. The dark brown solid poly(1,3,4-oxadiazole) recovered had a reduced viscosity of 0.09 (when measured at a concentration of 0.2 gram in 100 ml. of sulfuric acid at 25° C.) and a melting point range of about 183 to 210° C.

EXAMPLE 3

Preparation of poly(1,3,4-oxadiazole) by cyclodehydration of a polyhydrazide with polyphosphoric acid.

A three-necked 100 ml. flask, equipped with a mechanical stirrer, condenser, thermometer and nitrogen inlet tube was charged with 20 ml. of polyphosphoric acid. The flask and contents were heated to about 200° C. and 1.2 grams of the polyhydrazide described in Example 1 was added in the form of finely divided particles. This mixture was stirred for 3 hours at 200° C. Poly(1,3,4-oxadiazole) was isolated by pouring the reaction mixture into an excess of ice water, filtering, washing in a Waring Blendor with water and filtering again. The dark brown solid having the repeating units delineated in Example 1 was dried in a vacuum oven at 70° C. This product had a reduced viscosity of 0.12 (when measured at a concentration of 0.2 gram in 100 ml. of sulfuric acid at 25° C.) and a melting point range of about 186–310° C.

EXAMPLE 4

Example 3 was repeated with the exception that the reaction time at 200° C. was 3 hours instead of 2 and 1.2 grams of a normally solid polyhydrazide was used having repeating units which may be represented as:

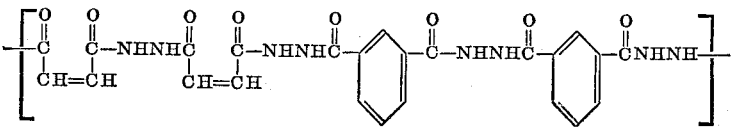

The dark brown solid poly(1,3,4-oxadiazole) recovered had a reduced viscosity of 0.09 and a melting point of about 300° C. The product having the repeating units:

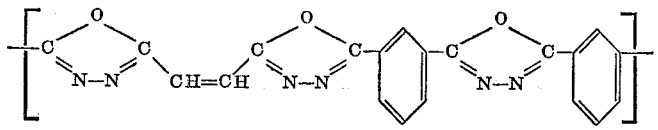

showed an elemental analysis for oxygen as follows:
Calculated for $C_{32}H_{16}N_{10}O_5$ (percent): O, 12.90. Found (percent): O, 12.01.

EXAMPLE 5

Preparation of poly(1,3,4-oxadiazole) by cyclodehydration of a polyhydrazide with phosphorus pentoxide.

A three-necked 100 ml. flask, equipped with a mechanical stirrer, condenser, thermometer and nitrogen inlet tube was charged with 14.2 g. (0.1 mole) of phosphorus pentoxide and 40 ml. of triisopropyl amine. This mixture was heated to reflux (about 150° C.) affording a brown-colored slurry. Finely divided particles (1.2 grams) of the polyhydrazide described in Example 1 were charged to the flask with stirring and refluxing continued for 2 hours. The brown solution which resulted was cooled to room temperature and successively extracted with dimethyl ether and water to remove unreacted reagents and phosphoric acid. The product, poly(1,3,4-oxadiazole) was washed with water and acetone, filtered and dried in a vacuum oven at 70° C. This polymer had a reduced viscosity of 0.09 and a melting point of about 300° C.

Although the invention has been described in its preferred forms with a certain degree of particularity, it is understood that the present disclosure has been made only by way of example, and that numerous changes in the details may be made without departing from the spirit and scope of the invention.

What is claimed is:

1. Normally solid poly(1,3,4-oxadiazoles) having repeating units represented by the structure:

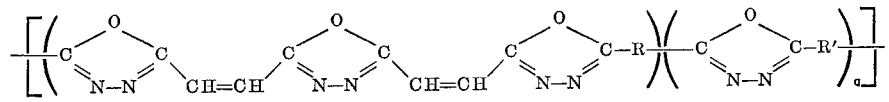

wherein R is a divalent hydrocarbon radical selected from the group consisting of alkylene radicals having 1 to about 18 carbon atoms and phenylene radicals, R' is a phenylene radical and $q$ is an integer having a value of 0 to 1.

2. Poly(1,3,4-oxadiazole) claimed in claim 1 wherein R is —(CH$_2$)$_8$—.

3. Poly(1,3,4-oxadiazole) claimed in claim 1 wherein R is

4. Poly(1,3,4-oxadiazole) claimed in claim 1 wherein R is

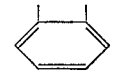

5. Poly(1,3,4-oxadiazole) claimed in claim 1 wherein R is

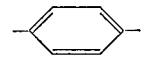

References Cited
UNITED STATES PATENTS 2,765,304  10/1956  Siegrist et al. _____ 260—240

OTHER REFERENCES

Frazer et al., Chemical Abstracts, vol. 60, col. 12120 (1964).

Iwakura et al., Chemical Abstracts, col. 9029 (1966).

JOHN D. RANDOLPH, Primary Examiner